US007297739B2

(12) United States Patent
Chen et al.

(10) Patent No.: US 7,297,739 B2
(45) Date of Patent: Nov. 20, 2007

(54) POLYMER PRECURSOR DISPERSION CONTAINING A MICROPULP AND METHOD OF MAKING THE DISPERSION

(75) Inventors: John Chu Chen, Hockessin, DE (US); Arnold Frances, Glen Allen, VA (US); Sam Louis Samuels, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/301,931

(22) Filed: Dec. 13, 2005

(65) Prior Publication Data
US 2006/0094799 A1 May 4, 2006

Related U.S. Application Data

(62) Division of application No. 10/428,294, filed on May 2, 2003, now Pat. No. 7,015,274.

(51) Int. Cl.
 *C08J 3/02* (2006.01)
 *C08J 3/11* (2006.01)
 *C08L 9/00* (2006.01)
 *C08K 7/02* (2006.01)

(52) U.S. Cl. ............... 524/430; 523/223; 524/457; 524/492; 524/493; 524/494; 524/495; 524/496; 524/502; 524/503; 524/537; 524/538; 524/539; 524/540; 524/543; 524/548; 524/555; 524/568; 524/599; 524/700; 524/849

(58) Field of Classification Search ............. 523/223; 524/430, 457, 492, 493, 502, 494, 503, 495, 524/496, 537, 538, 539, 540, 599, 543, 700, 524/548, 849, 555, 560
See application file for complete search history.

(56) References Cited

U.S. PATENT DOCUMENTS

| 4,439,561 A | 3/1984 | Barber |
| 6,103,790 A | 8/2000 | Chanzy et al. |

FOREIGN PATENT DOCUMENTS

| JP | 55-102628 | * | 8/1980 |
| JP | 55102628 A | | 8/1980 |
| JP | 58 191296 A | | 11/1983 |
| JP | 3-28243 | * | 2/1991 |
| JP | 03028243 A | | 2/1991 |
| JP | 03 180506 A | | 8/1991 |
| WO | WO 93/01333 | * | 1/1993 |
| WO | WO 93/04300 A | | 3/1993 |

OTHER PUBLICATIONS

U.S. Appl. No. 10/295,455, Kelly et al.
U.S. Appl. No. 10/295,341, Kelly et al.
U.S. Appl. No. 10/401,347, Blankenbeckler et al.
U.S. Appl. No. 60/462,236, Sormani et al.

* cited by examiner

*Primary Examiner*—Ana Woodward

(57) ABSTRACT

This invention relates to a polymer precursor dispersion for use in making a polymer that is a solid at room temperature and further relates to a method of making same where the dispersion comprises a polymer precursor comprising an addition monomer, a condensation monomer, a prepolymer, or a polymer modifier and 0.01 to 50 weight percent of a micropulp having a volume average length of from 0.01 to 100 micrometers.

10 Claims, No Drawings

POLYMER PRECURSOR DISPERSION CONTAINING A MICROPULP AND METHOD OF MAKING THE DISPERSION

BACKGROUND OF THE INVENTION

1. Field of the Invention

This invention is directed to a process for incorporating a micropulp in a polymer precursor, the resulting dispersion, polymer made from that dispersion, and articles made from that polymer.

2. Description of Related Art

Pulps, because of their fibrous nature, can be difficult to uniformly disperse in other materials. Many polymers can be enhanced by the addition of a pulp, and even very small additions of pulp can have a positive effect.

U.S. patent application Ser. No. 10/295,455 filed Nov. 15, 2002 relates to a process for producing micropulp in a liquid component and discloses that liquid component can be an aqueous liquid, one or more liquid polymers, one or more solvents, or a combination thereof.

U.S. patent application Ser. No. 10/295,341 filed Nov. 15, 2002 relates to coating compositions made from a dispersion of micropulp in a liquid component selected from the group consisting of an aqueous liquid, one or more liquid polymers, one or more solvents, or a combination thereof.

U.S. patent application Ser. No. 10/401,347 filed on Mar. 28, 2003 relates to a liquid nail polish compositions containing micropulp wherein the micropulp is made in a nail polish resin system comprising a resin and a solvent.

U.S. patent application 60/462,236 filed on Apr. 11, 2003 relates to coating compositions and molded products containing acetoacetylated polyvinyl polymers and discloses a method of producing a molded article comprising mixing micropulp with a composition comprising acetoacetylated polyvinyl polymers, melting the polymers and then making a molded shape from the mixture of micropulp and polymer.

All of these references concern the formation and incorporation of a micropulp in a liquid polymer or a polymer solutioned in a solvent. However many polymers are not available in a useable liquid form, either due to high viscosity or because they are solid at room temperature, and some of these polymers are either not suited to be liquefied via thermal or other means.

BRIEF SUMMARY OF THE INVENTION

This invention is directed to a polymer precursor dispersion for use in making a polymer that is a solid at room temperature, comprising a polymer precursor comprising an addition monomer, a condensation monomer, a prepolymer, or a polymer modifier; and a micropulp having a volume average length of from 0.01 to 100 micrometers, the micropulp comprising 0.01 to 50 weight percent of the dispersion.

This invention is further directed to a method of incorporating a micropulp in a polymer precursor for making a polymer that is a solid at room temperature, comprising contacting organic fiber, a polymer precursor and a solid component, agitating the organic fiber, the polymer precursor, and the solid component to transform the organic fiber into a micropulp having a volume average length of from 0.01 to 100 micrometers dispersed in the polymer precursor, and optionally removing the solid component.

DETAILED DESCRIPTION OF THE INVENTION

This invention relates to a polymer precursor dispersion containing a micropulp and a method of incorporating a micropulp in a polymer precursor for making a polymer. This polymer precursor dispersion can then be reacted, polymerized, or otherwise combined with a polymer to create a polymer having dispersed therein a micropulp.

Polymer Precursor Dispersion

The polymer precursor dispersion of the present invention is for use in making a polymer that is a solid at room temperature. The dispersion comprises a polymer precursor comprising an addition monomer, a condensation monomer, a prepolymer, or a polymer modifier. The dispersion further comprises a micropulp having a volume average length of from 0.01 to 100 micrometers, the micropulp comprising 0.01 to 50 weight percent of the dispersion.

Micropulp

As used herein, micropulp is a processed organic fiber having a volume average length ranging from 0.01 to 100 micrometers, preferably 0.1 to 50 micrometers. Such micropulps generally have an average surface area ranging from 25 to 500 square meters per gram. The micropulp of the present invention is a fibrous organic material that includes an intermeshed combination of two or more webbed, dendritic, branched, mushroomed or fibril structures.

Micropulp is made by contacting an organic fiber with a medium comprised of a liquid component and a solid component and then agitating the combination to size reduce and modify the organic fiber. The organic fiber used as a starting material can include pulp, short fiber, fibrids or mixtures of these forms. Through this treatment the micropulp is uniformly dispersed in the liquid component.

Pulps can be made by refining short fibers between rotating discs to cut and shear the fibers into smaller pieces. Pulp particles differ from short fibers by having a multitude of fibrils or tentacles extending from the body of each pulp particle. These fibrils or tentacles provide minute hair-like anchors for reinforcing composite materials and cause the pulp to have a very high surface area. A particularly useful starting material is aramid pulp, which is well known in the art and can be made by refining aramid fibers to fibrillate the short pieces of aramid fiber material. Such pulps have been reported to have a surface area in the range of 4.2 to 15 meters$^2$/gram and a Kajaani weight average length in the range of 0.6 to 1.1 millimeters (mm). Such pulps have high volume average length, compared to the micropulp. For example, Style 1F543 aramid pulp available from E. I. du Pont de Nemours and Company has a Kajaani weight average length in the range of 0.6 to 0.8 mm, and when laser defraction is used to measure this pulp the volume average length is 500 to 600 micrometers (0.5 to 0.6 mm). An alternate method of making aramid pulp directly from a polymerizing solution is disclosed in U.S. Pat. No. 5,028,372.

Short fiber (sometimes called floc) is made by cutting continuous filament into short lengths without significantly fibrillating the fiber. Short fiber length typically ranges from about 0.25 mm to 12 mm. Short fibers suitable for use in the present invention are the reinforcing fibers disclosed in U.S. Pat. No. 5,474,842.

Fibrids are non-granular film-like particles having an average maximum length or dimension in the range of 0.2 to 1 mm with a length-to-width aspect ratio in the range of 5:1 to 10:1. The thickness dimension is on the order of a fraction of a micron. Aramid fibrids are well known in the art and can be made in accordance with the processes disclosed in U.S. Pat. Nos. 5,209,877, 5,026,456, 3,018,091 and 2,999,788. The processes typically include adding a solution of organic polymer in solvent to another liquid, that is a non-solvent for the polymer but is miscible with the solvent, and applying vigorous agitation to cause coagulation of fibrids. The coagulated fibrids are wet milled, separated, and dried to yield clumps of fibrids having a high surface area; the clumps are then opened to yield a particulate fibrid product.

Micropulp used in the present invention can be made from an organic fiber comprised of aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. Especially useful polymers are made from aromatic polyamides, polybenzoxadiazole, polybenzimidazole, or a mixture thereof. Other organic fibers suitable for use in the present invention include natural fibers, such as cellulose, cotton, silk, and/or wool fibers.

Some commercially available fibers useful as a starting material for micropulp include ZYLON® PBO-AS (poly(p-phenylene-2,6-benzobisoxazole)) fiber, ZYLON® PBO-HM (poly(p-phenylene-2,6-benzobisoxazole)) fiber, DYNEEMA® SK60 and SK71 ultra high strength polyethylene fiber, all supplied by Toyobo, Japan; Celanese VECTRAN® HS pulp, EFT 1063-178, supplied by Engineering Fibers Technology, Shelton, Conn.; CFF Fibrillated Acrylic Fiber supplied by Sterling Fibers, Inc., Pace, Fla.; and Tiara Aramid KY-400S Pulp supplied by Daicel Chemical Industries, Ltd., 1 Teppo-Cho, Sakai City Japan.

The preferred organic fibers comprise fibers made from the aromatic polyamide polymers poly(p-phenylene terephthalamide) and/or poly(m-phenylene isophthalamide). Such fibers are also known as aramid fibers. As used herein, "aramid" is meant a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Such organic fibers are disclosed in U.S. Pat. Nos. 3,869,430; 3,869,429; 3,767,756; and 2,999,788. Preferred aromatic polyamide organic fibers are known under the trademark KEVLAR® fibers, KEVLAR® aramid pulp, style 1 F543; 1.5 mm KEVLAR® aramid floc style 6F561; and NOMEX® aramid fibrids style F25W. All of these are available from E. I. du Pont de Nemours and Company, Wilmington, Del.

Polymer Precursor

The polymer precursor of this invention can be an addition monomer, a condensation monomer, or a prepolymer or a polymer modifier.

Addition monomers are well known in the art and a non-limiting example is methyl methacrylate, which can polymerize with itself to make poly(methyl methacrylate), or with other monomers such as ethyl acrylate to make an acrylate compolymer. Other addition monomers useful in this invention include vinyl monomers such as styrene, acrylonitrile, and vinyl chloride.

Condensation monomers are also well known in the art and for the purposes of this invention can be one or more of the reactants used in a condensation reaction to form a monomer or polymer, or one of the actual monomers formed by the reactants. One useful but non-limiting example of a condensation monomer is ethylene glycol, which can be reacted with dimethyl terephalate and used to form the polymer polyethylene terephthalate. Other condensation monomers useful in this invention include diethylene glycol, 1,3 propane diol, 1,4 butane diol, or cyclohexane dimethanol.

A prepolymer is a partially polymerized polymer that has low molecular weight and can be further polymerized to a higher molecular weight. By partially polymerized it is meant the reacting monomers are not present in the proper stoichiometric ratio for fully polymer chain development, which prevents the generation of high molecular weight. Such proper stoichiometric ratio of monomers is normally 1:1 for many polymers. Such prepolymers have low molecular weight, meaning they are only able to form very short chains having only a few repeat units, normally less than about 20 repeat units, and typically less than about 10 repeat units. A non-limiting example of a prepolymer is a polyamide acid. After a polymer precursor dispersion of micropulp and polyamide acid is made, a polymer is then made from the dispersion by first adjusting the stoichiometric ratio of the prepolymer by adding additional monomer. The polymer is then made by imidizing the prepolymer by heat to make a polyimide polymer. Other useful prepolymers can include any low molecular weight oligomers that can subsequently be polymerized, such as a polyester oligomer. For the purposes of this invention, a prepolymer can also be an emulsified polymer dispersion that is further reacted to form a useful polymer. For example, some acid copolymers can be reacted with metal salts to form intractable polymer compositions. Micropulp can be incorporated into these polymers by first producing the micropulp in an emulsion of the acid copolymer. The resulting polymer precursor dispersion can then be used to form the polymer. A non-limiting example of a suitable acid copolymer is an ethylene copolymer containing the polar comonomer methacrylic acid.

The polymer precursor can also be a polymer modifier. For the purposes of this invention, a polymer modifier is a material that is compatible with and substantially remains in the final polymer. The polymer modifier is not meant to be a solvent for the final polymer or a polymer itself, but modifies the final polymer in some way. For example, a polymer modifier can be an additive such as a plasticizer for the polymer or a curing agent for the polymer. Other types of polymer modifier can function, for example, as a property enhancer, a processing aid, or a surface lubricating agent. A non-limiting example of a polymer modifier is a liquid fatty acid such as oleic acid, which can be combined with an ethylene-copolymer-based acid copolymer or ionomer while it is being mixed and neutralized. This polymer modifier oleate enhances the resilience of the polymer.

The preferred polymer precursors used in this invention have a viscosity at room temperature of less than 10,000 centipoise. Above 10,000 centipoise, the liquid viscosity can be too high to adequately incorporate and process the organic fiber into a micropulp.

Solid Components

The shape of the solid component that is contacted with the polymer precursor and the organic fiber is not critical and can include spheroids, diagonals, irregularly shaped particles or combinations thereof. Spheroids are preferred. The maximum average size of the solid component can range from 10 micrometers to 127,000 micrometers, and it depends upon the type of agitating device used to produce the micropulp. For example, when attritors are used, the size generally varies from about 0.6 mm diameter to about 25.4 mm. When media mills are used, the diameter generally varies from about 0.1 to 2.0 mm, preferably from 0.2 to 2.0 mm. When ball mills are used, the diameter generally varies from about 3.2 mm (⅛") to 76.2 mm (3.0 inches), preferably from 3.2 mm (⅛") to 9.5 mm (⅜ inches). The solid component is generally chemically compatible with the liquid component and typical solid components are made from glass, alumina, zirconium oxide, zirconium silicate, cerium-stabilized zirconium oxide, fused zirconia silica, steel, stainless steel, sand, tungsten carbide, silicon nitride, silicon carbide, agate, mullite, flint, vitrified silica, borane nitrate, ceramics, chrome steel, carbon steel, cast stainless steel, plastic resin, or a combination thereof. Some of the plastic resins suitable for the solid component include polystyrene, polycarbonate, and polyamide. Some of the glass suitable for the solid component includes lead-free soda lime, borosilicate and black glass. Zirconium silicate can be fused or sintered.

The most useful solid component are balls made of carbon steel, stainless steel, tungsten carbide or ceramic. If desired, a mixture of balls having the same size but different composition or having varying sizes can also be used. Ball diameter can range from about 0.1 millimeters to 76.2 millimeters and preferably from about 0.4 millimeters to 9.5 millimeters, more preferably from about 0.7 millimeters to 3.18 millimeters. Solid components are readily available from various sources, some of which include Glenn Mills, Inc., Clifton, N.J.; Fox Industries, Inc., Fairfield, N.J.; and Union Process, Akron, Ohio.

Polymer and Articles

Once the micropulp is incorporated into a polymer precursor, the polymer precursor dispersion can be reacted, polymerized or otherwise processed or converted into a polymer containing micropulp using conventional methods. The polymer having a micropulp dispersed therein, made from the polymer precursor dispersion of this invention, can be any type of thermoplastic, thermoset, or other type of polymer as long as it is a solid at room temperature. The polymer can be further processed in any conventional manner, such as spun, extruded, shaped or molded into various articles (including fibers and films) or parts. Since the process of incorporating the micropulp into the polymer almost assures the micropulp will be well dispersed, the shaped articles or parts will have uniform mechanical properties. The extremely small size of the micropulp substantially eliminates the pluggage problems encountered when shaping larger prior art pulps Methods of Incorporating Micropulp The method of incorporating a micropulp in a polymer precursor for making a polymer that is a solid at room temperature, comprises a contacting step, an agitating step, and optionally a removing step. The contacting step comprises contacting organic fiber, a polymer precursor and a solid component. The agitating step comprises agitating the organic fiber, the polymer precursor, and the solid component to transform the organic fiber into a micropulp having a volume average length of from 0.01 to 100 micrometers dispersed in the polymer precursor. The optional removing step comprises optionally removing the solid component.

Contacting Step

In this invention, micropulp is made in a polymer precursor that is the liquid component in which the organic fiber is processed. Such polymer precursors, if liquid at normal temperatures, can be used neat without solvent. However, if the polymer precursor is solid, or too viscous, the polymer precursor can be solutioned in a solvent and used in that fashion. If the polymer precursor is used without solvent, it is preferred the micropulp be present in an amount of 0.01 to 10 weight percent, based on the total weight of the polymer precursor and micropulp. If a solvent is added to the polymer precursor, the preferred amount of organic fiber present is 0.01 to 10 weight percent based on the total amount of polymer precursor, fiber, and solvent present. However, a concentrated polymer precursor can be made by removing all or a portion of the solvent from the dispersion after the micropulp is formed. In this manner a polymer precursor having concentrations of 50 weight percent micropulp or higher can be formed.

In the process for forming the polymer precursor dispersion of this invention, the organic fiber is processed, in the presence of a polymer precursor, into micropulp having a volume average length ranging from 0.01 micrometers to 100 micrometers, and an average surface area of from 25 to 500 square meters per gram. This is accomplished by contacting and agitating the organic fibers with a liquid polymer precursor and a solid component. Agitating the organic fibers in the presence of solid components size-reduce and modify the organic fibers. The organic fibers repeatedly come in contact with and are masticated by the solid components maintained in an agitated state by, for example, one or more stirring arms of an attritor. Unlike the conventional grinding or chopping processes that tend to largely reduce only fiber length, albeit with some increase in surface area and fibrillation, the size reduction in the process of this invention results from both longitudinal separation of the organic fibers into substantially smaller diameter fibers along with a length reduction. Average fiber length reductions of one, two or even greater orders of magnitude can be attained. The agitating step is continued for sufficient duration to transform the organic fibers into the micropulp. Moreover, it may be desirable to incrementally transform the organic fiber into the micropulp in several passes by repeatedly passing the medium containing the organic fibers through the agitation device.

Agitating Step

When the polymer precursor dispersion containing micropulp is made by agitating a solid component and a liquid polymer precursor or polymer precursor solution, the surface of the micropulp is fully wetted and uniformly distributed in the dispersion, with minimal agglomerations or clumps.

The processing of organic fibers into micropulp can be accomplished in any one or more types of agitating devices, including an attritor or a mill, and the devices can be batch or continuously operated. Batch attritors are known in the art and those such as attritor models 01, 1-S, 10-S, 15-S, 30-S, 100-S and 200-S supplied by Union Process, Inc., of Akron, Ohio are well suited for the process of the present invention. Another supplier of such devices is Glen Mills Inc. of Clifton, N.J. Media mills are supplied by Premier Mills, Reading Pa., and some of their suitable mills include the Supermill HM and EHP models.

The preferred agitation device is an attritor, and preferably the solid component is poured into the agitation chamber of the attritor and then agitated by the stirring arms, after which the premix of organic fibers and liquid component is then poured into the chamber. To accelerate the rate of transformation, the solid component is circulated during the agitating step through an external passage that is typically connected near the bottom and the top of the chamber for a vertical media mill. The rate at which the solid component is agitated depends upon the physical and chemical make-up of the organic fibers being transformed, the size and type of the solid component, the duration of the transformation, as well as the size of the micropulp desired. The agitation of the solid component in an attritor is generally controlled by the tip speed of the stirring arms and the number of stirring arms provided. A typical attritor has four to twelve arms and the tip speed of the stirring arms generally range from about 150 fpm to about 1200 fpm (about 45 meters per minute to about 366 meters per minute). The preferred attritor has six arms and is operated at a tip speed in the range of about 200 fpm to about 1000 fpm (about 61 meters per minute to about 305 meters per minute) and more preferably from about 300 fpm to about 500 fpm (about 91 meters per minute to about 152 meters per minute). If a media mill is used, the tip speeds of the stirring arms generally range from about 1500 fpm to about 3500 fpm (about 457 meters per minute to about 1067 meters per minute) and preferably from about 2000 fpm to about 3000 fpm (about 610 meters per minute to about 914 meters per minute). Any excessive heat generated in the agitation process is normally removed by use of a cooling jacket on the agitation chamber.

The amount of solid component used in the agitating chamber is called the load, and is measured by the bulk volume and not the actual volume of the agitating chamber. Thus, 100% load means about 60% of the chamber volume since substantial air pockets exist within the solid component. The load for the media mill or an attritor ranges from 40% to 90%, preferably from 75% to 90% based on the full load. The load for the ball mill ranges from 30% to 60% based on the full load. In practice, the percent load is determined by first totally filling the chamber with the solid component to determine the weight of a full load. The desired load is then measured by weight as a percent of the full load.

Optional Removing Step

After the organic fiber is transformed into a micropulp, normally the solid component is removed to form a dispersion of the micropulp in the polymer precursor. Typically the solid component remains in the agitating chamber. However, if needed, some of the conventional separation processes include a mesh screen having openings that are small enough for the polymer precursor dispersion containing the micropulp to pass through while the solid component is retained on the mesh screen. Thereafter, the dispersion can be used directly. Typically, the dispersion of the preferred micropulp, when visually observed on a 254 microns (10 mils) draw-down on a glass, contains negligible grit or seed.

Test Methods

Volume average length measurements were made using laser diffraction using a Beckman LS Particle Size Analyzer. Single point nitrogen BET surface area measurements were made using a Strohlein Area Meter. As used herein, the volume average length is calculated by the following equation:

$$\frac{\sum (\text{number of fibers of given length}) \times (\text{length of each fiber})^4}{\sum (\text{number of fibers of given length}) \times (\text{length of each fiber})^3}$$

EXAMPLES

This invention will now be illustrated by the following specific examples. All parts and percentages are by weight unless otherwise indicated. Examples and samples prepared according to the process or processes of the current invention are indicated by numerical values. Control or Comparative Examples and samples are indicated by letters.

Example 1

This example illustrates a method for making a polymer precursor dispersion of micropulp in a condensation monomer, and then polymerizing the condensation monomer to make a polymer. For this example, the condensation monomer is ethylene glycol and the final polymer is a polyester.

The polymer precursor dispersion was prepared by adding 300 grams of poly(paraphenylene terephthalamide) pulp (KEVLAR® pulp Merge 1F543 available from E. I. du Pont de Nemours and Company) to 12,908 grams of ethylene glycol in a tank to form a dispersion of pulp in ethylene glycol having a pulp content of 2.27 weight percent. The pulp was dispersed using a high speed disperser with a cowles blade running at a speed high enough to create a vortex in the dispersion. The dispersion was then recirculated through a 1.5 liter Premier SML Supermill. The mill was run with a circumferential disk speed of 2400 feet per minute (732 meters per minute) and after 8 hours of recirculation a sample of the dispersion of micropulp in ethylene glycol was collected. This Sample 1 had a micropulp content of 2.27 weight percent. The remaining dispersion of micropulp in ethylene glycol was diluted with additional ethylene glycol until the micropulp content was 1.85 weight percent and this dispersion was recirculated for another 8 hours and collected, forming Sample 2 having a micropulp content of 1.85 weight percent. The volume average fiber length for these samples were about 5 and 3 micrometers, respectively, for the 8 and 16 hour samples. Samples are summarized in Table 1.

TABLE 1

| Sample | Recirculation Hours | Weight % Micropulp | Volume Average Fiber Length (micrometers) |
| --- | --- | --- | --- |
| 1 | 8 | 2.27 | 5 |
| 2 | 16 | 1.84 | 3 |

The polymer precursor dispersion Sample 1, having 2.27 weight percent micropulp in ethylene glycol, was used to make a polyester polymer having a micropulp dispersed therein. The polymer was made on a 40 pound (18 kilogram) horizontal autoclave with an agitator, vacuum jets, and a monomer distillation still located above the clave portion of the autoclave. The monomer distillation still was charged with 40 pounds (18 kilograms) of dimethyl terephthalate (DMT), 26 pounds (12 kilograms) of ethylene glycol, and 8.8 pounds (4 kilograms) of Sample 1. Tetrapropyl titanate was used as both the exchange and polymerization catalyst.

The temperature of the still was gradually raised to 240° C. and approximately 6000 grams of methanol distillate was recovered. The molten prepolymer was then dropped from the monomer still to the clave portion of the autoclave. There the prepolymer was mixed, agitated, and polymerized by increasing the temperature to approximately 280° C. The pressure was reduced to approximately 1 mm Hg (133 Pa) over about 2 hours and the material was held at these conditions for approximately 4 hrs. The polymer was extruded through a 3 hole casting plate, quenched and cut.

The polymer precursor of dispersion Sample 2, having 1.85 weight percent micropulp in ethylene glycol, was then used to make a polyester polymer having a micropulp dispersed therein by repeating the above steps with the exception that only 1 pound (0.45 kilograms) of Sample 2 was added to the monomer distillation still.

The polymer precursor of dispersion Sample 2, having 1.85 weight percent micropulp in ethylene glycol, was then used to make a polyester polymer having a micropulp dispersed therein by repeating the above steps with the exception that 2.2 pounds (1 kilogram) of Sample 2 was added to the monomer distillation still.

Example 2

This example illustrates a method for making a polymer precursor dispersion of micropulp in a condensation monomer, and then polymerizing the condensation monomer to make a polymer. For this example, the condensation monomer is 1,4-butanediol and the final polymer is a copolyetherester.

A series of samples of a nominal 1.5 weight percent micropulp dispersed in 1,4-butanediol was made by making a first mixture by adding 136.8 grams of poly(paraphenylene terephthalate) pulp (KEVLAR® pulp, Merge 1F543) to 8986 grams of 1,4-butanediol and running this through the 1.5 liter Premier media mill as in Example 1. Due to capacity limitations of the mix tank, while the first mixture was running through the mill a second mixture of an additional 6140 grams of 1,4-butanediol and 93.5 grams of pulp were added to the mix tank and this became combined with the first mixture. The combined mixtures were collected together after a single pass and this first polymer precursor dispersion containing micropulp was designated Sample 3. A second polymer precursor dispersion containing micropulp, Sample 4, was produced via two passes through the mill, after which an additional 535 g of butanediol were added to the remaining slurry. A third polymer precursor dispersion containing micropulp, Sample 5, was then produced by collecting a sample after 3 passes through the mill. After this sample was collected, the remaining 2-pass dispersion was put into recirculation. Subsequent Samples 6-9, respectively, were collected at 2, 4, 6 and 11 hours of recirculation through the mill. Because of the dilution and possibly some evaporation, the final weight percent micropulp was measured for these items. The results are shown in Table 2a.

TABLE 2a

| Sample | # of Passes | Recirculation Hours | Weight % Micropulp |
|---|---|---|---|
| 3 | 1 | — | 1.54 |
| 4 | 2 | — | 1.54 |
| 5 | 3 | — | 1.40 |
| 6 | 2+ | 2 | 1.45 |
| 7 | 2+ | 4 | 1.51 |
| 8 | 2+ | 6 | 1.57 |
| 9 | 2+ | 11 | 1.64 |

Copolyetherester polymers were made from selected samples from Table 2a and the ingredients listed in Table 2b. Also listed in Table 2b are the ingredients for a control Sample A from which a polymer was made without the polymer precursor dispersion containing micropulp. For all polymers, the ingredients from Table 2b were placed in an agitated flask fitted for distillation and a stainless steel stirrer with a paddle cut to conform with the internal radius of the flask was positioned about 2 mm from the bottom of the flask. The air in the flask was replaced with nitrogen by applying vacuum, and then re-pressurized with nitrogen. The flask was placed in a Woods metal bath at 155° C., and agitation initiated. The bath temperature was increased to 210° C., and it was held at 210° C. for 40 minutes. During this time, methanol distilled from the reaction mixture. Then, the bath temperature was increased to 250° C. over a period of 25 minutes. When the temperature reached 250° C., the pressure was gradually reduced to 200 Pa over a period of 20 minutes. The polymerization mass was then agitated at 250° C. and 200 Pa for another 30 minutes. The polymer mass became more viscous, and the torque on the stirrer increased during this time. The resultant viscous molten polymer was scraped from the flask and allowed to cool. Samples for physical testing were prepared by compression molding at about 200° C. for one minute and cooling rapidly in the press. Properties for the resultant polymers are shown in Table 2c. Surprisingly, the addition of a very minor amount of micropulp dramatically increased the mechanical properties of the polymer. Even more surprising and unexpected is the increase in both elongation and stress at 40% elongation. These properties normally respond by one being increased at the expense of the other.

TABLE 2b

| Ingredient | Parts |
|---|---|
| Polymer Containing Micropulp Dispersed Therein | |
| Poly(tetramethyleneether) glycol, number average molecular weight of about 975 | 27.0 |
| Dimethyl Terephthalate | 24.2 |
| Dimethyl Isophthalate | 7.0 |
| Micropulp dispersed in 1,4-butanediol | See Table 3 |
| 2% Solution of Trimethyl Trimellitate dissolved in 1,4-butanediol | 2.0 |
| 5% Solution of Tetrabutyl Titanate dissolved in 1,4-butanediol | 1.2 |
| N,N'-Hexamethylene bis(3,5-di-tert-butyl-4-hydroxyhydrocinnamide | 0.09 |
| N,N'-Trimethylene bis(3,5-di-tert-butyl-4-hydroxyhydrocinnamide | 0.09 |
| Control Sample A Polymer | |
| Poly(tetramethyleneether) glycol, number average molecular weight of about 975 | 27.0 |
| Dimethyl Terephthalate | 24.2 |
| Dimethyl Isophthalate | 7.0 |
| 1,4-butanediol | 18.0 |
| 2% Solution of Trimethyl Trimellitate dissolved in 1,4-butanediol | 2.0 |

TABLE 2b-continued

| Ingredient | Parts |
|---|---|
| 5% Solution of Tetrabutyl Titanate dissolved in 1,4-butanediol | 1.2 |
| N,N'-Hexamethylene bis(3,5-di-tert-butyl-4-hydroxyhydrocinnamide | 0.09 |
| N,N'-Trimethylene bis(3,5-di-tert-butyl-4-hydroxyhydrocinnamide | 0.09 |

TABLE 3

| Sample | # of Passes | Recirculation Hours | Volume Average Length (micrometers) |
|---|---|---|---|
| 10 | 1 | — | 100 |
| 11 | 2 | — | 39 |
| 12 | 2+ | 1 | 12 |
| 13 | 2+ | 3 | 3.4 |

TABLE 2c

| | Sample Used In Polymer | | | | |
|---|---|---|---|---|---|
| | A | 3 | 5 | 5 | 9 |
| | | | Color | | |
| | clear colorless | light yellow | light yellow | light yellow | light yellow |
| Melt Flow Index @ 190 C. | 8.5 | 1.6 | 2.3 | 2.9 | 2.0 |
| Polymer Precursor Dispersion (Parts) | 0 | 20 | 20 | 60 | 20 |
| Micropulp content (wt %) | 0 | 0.5 | 0.5 | 1.5 | 0.5 |
| Thickness (mil) | 49 | 57 | 57 | 57 | 57 |
| Tb (psi) | 4169 | 5841 | 5098 | 2296 | 5906 |
| Eb (%) | 1271 | 1458 | 1353 | 556 | 1444 |
| Young's Modulus (psi) | 7305 | 5517 | 6285 | 8706 | 4990 |
| Toughness (psi) | 29071 | 44470 | 36907 | 10160 | 44398 |
| Stress at 40% Elongation(psi) | 1067 | 1224 | 1197 | 1525 | 1184 |
| Tear Peak Load (lbf) | 13.30 | 17.05 | 19.46 | 8.79 | 21.92 |
| Energy to Tear(in-lbf) | 26.43 | 30.34 | 37.15 | 17.54 | 33.50 |

Example 3

This example illustrates a method for making a polymer precursor dispersion of micropulp in an addition monomer, and then polymerizing the addition monomer to make a polymer. For this example, the addition monomer is methyl methacrylate and the final polymer is a poly(methyl methacrylate).

As in previous examples, the polymer precursor dispersion containing micropulp was produced using a 1.5 liter Premier mill. The mix tank was filled with 7840 grams of methyl methacrylate and 160 grams of poly(paraphenylene terephthalamide) pulp (KEVLAR® pulp, Merge 1F543). As in Example 2, due to capacity limitations of the mix tank, while the first mixture was running through the mill a second mixture of an additional 4704 grams of methyl methacrylate and 96 grams of pulp were added to the mix tank and this became combined with the first mixture. The combined mixtures were collected together after a single pass and this first polymer precursor dispersion containing micropulp was designated Sample 10 and had a volume average length of 100 micrometers. The remaining dispersion was passed through the mill a second time, and a 2-liter sample designated Sample 11 was collected. The volume average length of the micropulp in this dispersion was 39 micronmeters. The remaining dispersion was then put into recirculation through the mill. After 1 hour, another 2 liter sample designated Sample 12 was collected and the micropulp in this dispersion had a volume average length of 12 micrometers. After 2 more hours, or a total of 3 hours of recirculation, another sample designated Sample 13 of 3 liters was collected and the volume average length of the micropulp in this precursor dispersion was 3.4 microns. The samples are summarized in Table 3.

Each of these polymer precursor dispersions, each containing micropulp and an addition monomer, was then each polymerized with itself (addition reaction) to produce poly (methyl methacrylate) polymer having a micropulp dispersed therein.

Example 4

This example illustrates a method for making a polymer precursor dispersion of micropulp in a prepolymer, and then polymerizing the prepolymer to make a polymer having a micropulp dispersed therein. For this example, the prepolymer is an emulsion and the final polymer is a copolymer of ethylene and methacrylic acid.

As in previous examples, the polymer precursor dispersion containing micropulp was produced in a 1.5 liter Premier mill. The mix tank was filled with 3908 grams of AQUASEAL® 1243 and 120.8 grams of wet poly(paraphenylene terephthalamide) pulp, available from E. I. du Pont de Nemours and Company as KEVLAR® pulp, Merge 1F361 (this is 50% water, so 60.4 grams of actual pulp were actually added). AQUASEAL® is an aqueous emulsion of approximately 25 percent by weight of a copolymer of ethylene and acrylic acid (19% by weight) and 75 percent demineralized water containing approximately 10 percent ammonium hydroxide. The mixture was recirculated through the mill with 150 ml samples designated Samples 14-16, respectively, of the polymer precursor dispersion taken after 2, 4, and 6 hours of recirculation. The remainder was collected after 9 hours of recirculation and this was designated Sample 17. Samples are summarized in Table 4.

TABLE 4

| Sample | Recirculation Hours |
|---|---|
| 14 | 2 |
| 15 | 4 |
| 16 | 6 |
| 17 | 9 |

Polymers containing micropulp were made from each of the samples by injecting the polymer precursor dispersion into an extruder containing a molten copolymer of ethylene and methacrylic acid (19% by weight) that was partially neutralized (approximately 60%) with zinc ions. The water was vacuum extracted from the extruder and a copolymer having a micropulp dispersed therein was extruded in the form of pellets.

Example 5

This example illustrates a method for making a polymer precursor dispersion of micropulp in a polymer modifier, and then incorporating the polymer modifier in the polymer to make a polymer having micropulp dispersed therein. For this example, the polymer modifier is oleic acid and the final polymer is a copolymer of ethylene and methacrylic acid.

The polymer precursor dispersion containing micropulp of this example was produced in a larger 15 liter Premier mill. Poly(paraphenylene terephthalamide) pulp (Kevlar® pulp Merge 1F543) was mixed with oleic acid in quantities sufficient to form a 1 percent by weight dispersion of pulp in oleic acid. 188 pounds (85 kilograms) of the 1% dispersion was charged in the mix tank of the mill. This dispersion was fed to the 15 liter Premier mill at a rate of 2 lbs/min (0.9 kg/min) for a single pass through the mill and collected in another tank. These single passes were repeated until a total of 9 passes were completed. Samples of approximately 5 gallons were collected after 1, 2, 4, 6 and 9 passes and designated Samples 18-22, respectively, as shown in Table 5.

TABLE 5

| Sample | # of Passes |
|---|---|
| 18 | 1 |
| 19 | 2 |
| 20 | 4 |
| 21 | 6 |
| 22 | 9 |

Two polymers containing micropulp were made by injecting the 9-pass polymer precursor dispersion (Sample 22) into an extruder containing each individual polymer. The first polymer contained molten ionomers of a copolymer of ethylene and methacrylic acid (19% by weight) and the second polymer contained molten ionomers of a copolymer of ethylene, n-butylacrylate (23.5% by weight) and methacrylic acid (9% by weight) that was partially neutralized with magnesium hydroxide. For both polymers the water was vacuum extracted from the extruder and a polymer having a micropulp dispersed therein was extruded in the form of pellets.

Polymer containing micropulp were made by injecting the 9-pass polymer precursor dispersion (Sample 22) into an extruder containing molten ionomers of a copolymer of ethylene and methacrylic acid (19% by weight) and a copolymer of ethylene, n-butylacrylate (23.5% by weight) and methacrylic acid (9% by weight) that was partially neutralized with magnesium hydroxide. The water was vacuum extracted from the extruder and a copolymer having a micropulp dispersed therein was extruded in the form of pellets.

Example 6

This example illustrates a method for making a polymer precursor dispersion of micropulp in a prepolymer, and then polymerizing the prepolymer to make a polymer having a micropulp dispersed therein. For this example, the prepolymer is a polyamide acid and the final polymer is polyimide. This example also illustrates one method by which a solvent can be added to the polymer precursor and then later removed after the micropulp is formed in the polymer precursor.

To prepare the prepolymer, 4,4'-oxydianiline was solvated in dimethylacetamide (DMAc) solvent and a slightly less than equal molar amount (95-99% stoichiometry) of pyromellitic dianhydride added under agitation. The mixture was agitated until the polyamide acid, which is the prepolymer, was formed and the mixture has a viscosity of from 20 to 100 poise and the prepolymer was present in an amount of 10-30 percent by weight.

As in previous examples, the polymer precursor dispersion containing micropulp was produced using a 1.5 liter Premier mill. The mix tank was filled with the polyamide acid prepolymer mixture containing DMAc and poly(paraphenylene terephthalamide) pulp (KEVLAR® pulp Merge 1F543). Additional DMAc was added to the mixture. The final mixture was approximately 10.1 kilograms which contained about 7.5 percent by weight polyamide acid prepolymer, about 1 percent by weight poly(paraphenylene terephthalamide) pulp (KEVLAR® pulp Merge 1F543), and about 91.5 percent by weight DMAc. This mixture was then recirculated through the mill for 20 hours with 1 liter samples of the prepolymer dispersion containing micropulp being collected after 4, 8, 12, 16, and 20 hours of recirculation, with the samples being designated as Samples 23-27, respectively, as shown in Table 6

TABLE 6

| Sample | Recirculation Hours |
|---|---|
| 23 | 4 |
| 24 | 8 |
| 25 | 12 |
| 26 | 16 |
| 27 | 20 |

A polyimide polymer having micropulp dispersed therein is made from the prepolymer dispersion containing micropulp. The prepolymer is first "finished" by the addition of small amount of pyromellitic dianhydride with the goal being to bring the molar diamine/dianhydride ratio close to 1:1 to increase molecular weight and viscosity. Target final viscosity is between 200-5000 poise. A liquid film is then cast on a smooth surface using a die casting process. Initial temperatures while the liquid film is on the cast surface ramp up through an oven between 60° C.-200° C. over 5-60 minutes. The casting process removes DMAc solvent and creates a free-standing film containing 70-90% solids of micropulp and polyamide acid prepolymer.

The prepolymer film is then converted to a polyimide polymer film having micropulp dispersed therein by placing the film in a high temperature oven for imidization at 200 to 400° C. for 5 to 60 minutes.

Comparative Example A

This example illustrates the problems experienced with attempting to incorporate a micropulp into a high viscosity liquid polymer. The poly(paraphenylene terephthalamide) pulp used as a starting material in the previous examples as added to the well-known epoxy resin EPON 828 and an attempt was made to process the pulp in the epoxy resin to create a micropulp dispersed in the resin. EPON 828 has a viscosity of 11,000 centipoise at room temperature and consequently was too viscous to process in the mill so it was not possible to make a dispersion of micropulp in this highly viscous resin.

What is claimed is:

1. A method of incorporating a micropulp in a polymer precursor for making a polymer that is a solid at room temperature, comprising:

contacting organic fiber, a polymer precursor and a solid component selected from the group consisting of glass, alumina, zirconium oxide, zirconium silicate, cerium-stabilized zirconium oxide, fused zirconia silica, steel, stainless steel, sand, tungsten carbide, silicon nitride, silicon carbide, agate, mullite, flint, vitrified silica, borane nitrate, ceramics, chrome steel, carbon steel, cast stainless steel, plastic resin, or combinations thereof, agitating the organic fiber, the polymer precursor, and the solid component to transform the organic fiber into a micropulp having a volume average length of from 0.01 to 50 micrometers dispersed in the polymer precursor, and optionally removing the solid component.

2. The method of claim 1, wherein the polymer precursor comprises an addition monomer, a condensation monomer, or a prepolymer.

3. The method of claim 1, wherein the addition monomer is selected from the group consisting of methyl methacrylate, ethyl acrylate, styrene, acrylonitrile, and vinyl chloride; the condensation monomer is selected from the group consisting of ethylene glycol, dimethyl terephthalate, diethylene glycol, 1,3 propane dial, 1,4 butane diol, and cycolhexane dimethanol; or the prepolymer is selected from the group consisting of polyamide acid, polyester oligomer, and emulsified polymer dispersion.

4. The method of claim 1, wherein said polymer precursor has a viscosity of less than 10,000 centipoise.

5. The method of claim 1, wherein the polymer precursor further comprises a solvent.

6. The method of claim 5, further comprising the additional step of removing a portion of the solvent from the polymer precursor dispersion to form a concentrated polymer precursor dispersion.

7. The method of any one of claims 1-6, further comprising forming a polymer from the polymer precursor having micropulp dispersed therein.

8. The method of claim 7, further comprising forming an article from the polymer.

9. The method of claim 1, wherein the polymer precursor further comprises a polymer modifier selected from the group consisting of a polymer plasticizer, a polymer curing agent, a polymer property enhancer, a polymer processing aid, end a polymer surface lubricating agent.

10. The method of claim 1, wherein the solid component is a ball comprising a material selected from the group consisting of carbon steel, stainless steel, tungsten carbide, ceramic and combinations thereof.

* * * * *